United States Patent
Dyckerhoff et al.

(10) Patent No.: US 8,081,654 B2
(45) Date of Patent: *Dec. 20, 2011

(54) BANDWIDTH DIVISION FOR PACKET PROCESSING

(75) Inventors: Stefan Dyckerhoff, Palo Alto, CA (US);
Pankaj Patel, Cupertino, CA (US);
Pradeep Sindhu, Mountain View, CA (US); Ashok Krishnamurthi, San Jose, CA (US); Hann-Hwan Ju, San Jose, CA (US); Ramalingam Krishnamurthi Anand, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/723,303

(22) Filed: Mar. 12, 2010

(65) Prior Publication Data

US 2010/0165870 A1    Jul. 1, 2010

Related U.S. Application Data

(63) Continuation of application No. 11/470,040, filed on Sep. 5, 2006, now Pat. No. 7,706,357, which is a continuation of application No. 09/534,838, filed on Mar. 24, 2000, now Pat. No. 7,139,282.

(51) Int. Cl.
*H04J 3/16* (2006.01)
(52) U.S. Cl. ...................................... 370/465
(58) Field of Classification Search .................. 370/465, 370/352, 389, 401, 399, 468, 400, 498, 474, 370/392; 709/238
See application file for complete search history.

(56) References Cited

U.S. PATENT DOCUMENTS

| | | | |
|---|---|---|---|
| 5,335,325 A | 8/1994 | Frank et al. |
| 5,506,841 A | 4/1996 | Sandquist |
| 5,710,650 A | 1/1998 | Dugan |
| 5,757,771 A | 5/1998 | Li et al. |
| 5,905,725 A | 5/1999 | Sindhu et al. |
| 5,909,440 A | 6/1999 | Ferguson et al. |
| 5,953,314 A | 9/1999 | Ganmukhi et al. |
| 6,009,075 A | 12/1999 | Roberts et al. |
| 6,092,178 A | 7/2000 | Jindal et al. |
| 6,122,281 A | 9/2000 | Donovan et al. |
| 6,263,368 B1 | 7/2001 | Martin |
| 6,272,522 B1 | 8/2001 | Lin et al. |
| 6,324,580 B1 | 11/2001 | Jindal et al. |

(Continued)

OTHER PUBLICATIONS

Co-pending U.S. Appl. No. 11/332,402, filed Jan. 17, 2006; entitled: "Systems and Methods for Allocating Bandwidth for Processing of Packets"; 61 pages.

(Continued)

*Primary Examiner* — Chi Pham
*Assistant Examiner* — Alexander Boakye
(74) *Attorney, Agent, or Firm* — Harrity & Harrity, LLP (57) ABSTRACT

A bandwidth divider and method for allocating bandwidth between a plurality of packet processors. The bandwidth divider includes a plurality of counters for measuring the bandwidth of data packets transferred from the bandwidth divider to a respective packet processor; and a controller for analyzing the plurality of counters and transferring a data packet to a selected packet processor based on the contents of the counters. The method monitors the bandwidth consumed by the packet processors; determines, based on the bandwidth consumed by the packet processors, which packet processor has consumed the least amount of bandwidth; and allocates a next data packet to the packet processor which has consumed the least amount of bandwidth.

19 Claims, 10 Drawing Sheets

U.S. PATENT DOCUMENTS

| | | |
|---|---|---|
| 6,327,622 B1 | 12/2001 | Jindal et al. |
| 6,359,900 B1 | 3/2002 | Dinakar et al. |
| 6,385,209 B1 | 5/2002 | Skirmont et al. |
| 6,404,752 B1 | 6/2002 | Allen, Jr. et al. |
| 6,424,621 B1 | 7/2002 | Ramaswamy et al. |
| 6,446,146 B1 | 9/2002 | Yamaguchi et al. |
| 6,567,902 B1 | 5/2003 | Padmanabhan et al. |
| 6,587,469 B1 * | 7/2003 | Bragg .................... 370/401 |
| 6,601,084 B1 | 7/2003 | Bhaskaran et al. |
| 6,625,150 B1 | 9/2003 | Yu |
| 6,636,515 B1 | 10/2003 | Roy et al. |
| 6,643,719 B1 | 11/2003 | Baker |
| 6,646,983 B1 | 11/2003 | Roy et al. |
| 6,650,641 B1 | 11/2003 | Albert et al. |
| 6,728,492 B1 | 4/2004 | Baroncelli |
| 6,741,615 B1 | 5/2004 | Patwardhan et al. |
| 6,751,743 B1 | 6/2004 | Theodoras, II et al. |
| 6,754,174 B1 | 6/2004 | Ben-Zur et al. |
| 6,754,217 B1 | 6/2004 | Ahn |
| 6,791,947 B2 | 9/2004 | Oskouy et al. |
| 6,834,049 B1 | 12/2004 | Tomar et al. |
| 6,895,018 B1 | 5/2005 | Klish |
| 6,907,541 B1 | 6/2005 | Padmanabhan et al. |
| 7,016,367 B1 | 3/2006 | Dyckerhoff et al. |
| 7,139,282 B1 | 11/2006 | Dyckerhoff et al. |
| 7,164,698 B1 | 1/2007 | Krishnamurthi |

OTHER PUBLICATIONS

Co-pending U.S. Appl. No. 11/470,040, filed Sep. 5, 2006 entitled "Bandwidth Division for Packet Processing" by Stefan Dyckerhoff et al., 27 pages.

* cited by examiner

BANDWIDTH DIVISION FOR PACKET PROCESSING

This application is a continuation of U.S. patent application Ser. No. 11/470,040, filed Sep. 5, 2006, now U.S. Pat. No. 7,706,357 issued Apr. 27, 2010, which is a continuation of U.S. patent application Ser. No. 09/534,838 filed Mar. 24, 2000, now U.S. Pat. No. 7,139,282 issued Nov. 21, 2006, which are incorporated herein by reference.

TECHNICAL FIELD

This invention relates generally to data routing systems, and more particularly to a method and apparatus for forwarding data packets to processors.

BACKGROUND

A data packet is a variable size unit of communication in a network. A router is a switching device that receives packets containing data or control information on one port, and based on destination or other information contained within the packet, routes the packet out another port to the destination (or intermediary destination).

Conventional routers perform this switching function by evaluating header information contained within a first data block in the packet in order to determine the proper output port for a particular packet.

Figure 1A:
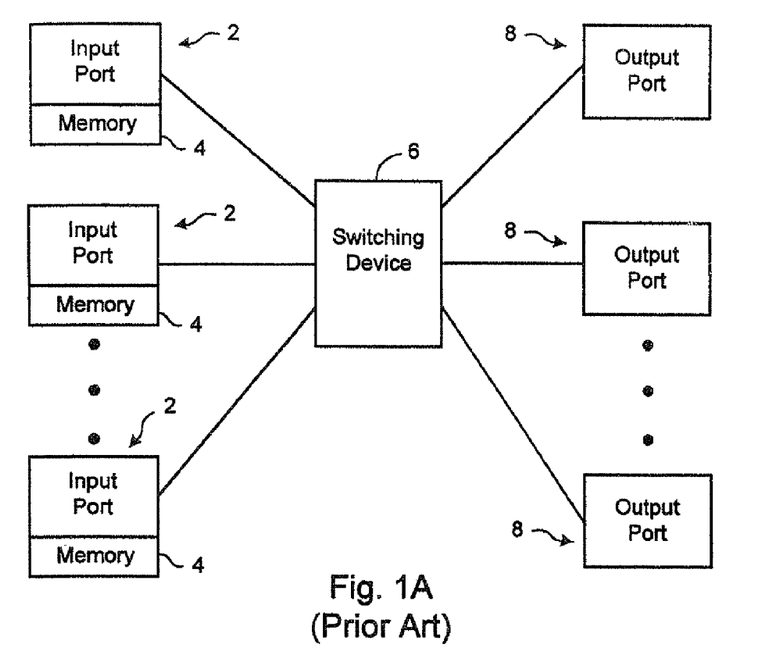
FIGS. 1a and 1b are block diagrams of conventional router devices.

Referring now to FIG. 1a, one type of conventional router includes a plurality of input ports 2 each including an input buffer (memory) 4, a switching device 6 and a plurality of output ports 8. Data packets received at an input port 2 are stored at least temporarily in input buffer 4 while destination information associated with each packet is decoded to determine the appropriate switching through the switching device 6.

Figure 1B:
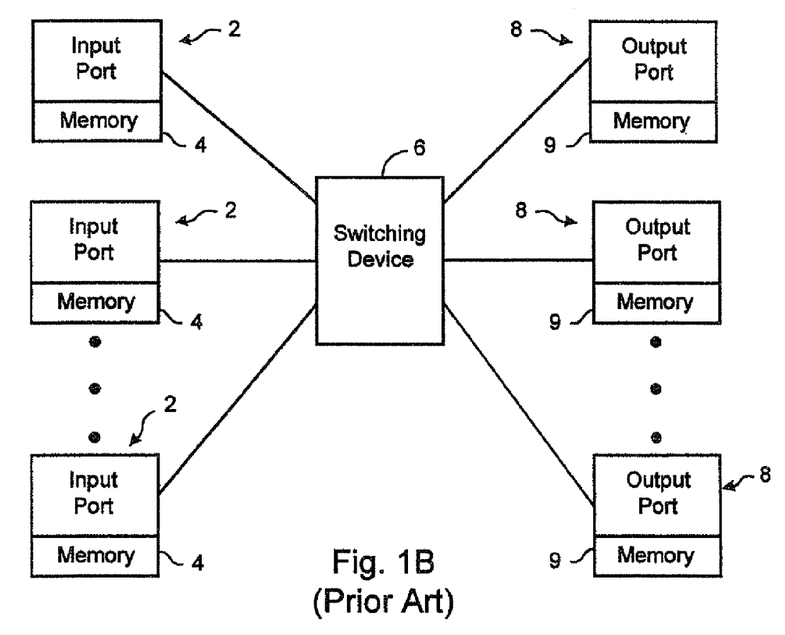

Another type of conventional router is referred to as a "non-blocking" router. Referring now to FIG. 1b, a conventional "non-blocking" router includes a plurality of input ports 2 each including an input buffer (memory) 4, a switching device 6 and a plurality of output ports 8 each having an output buffer (memory) 9. In order to avoid blocking conditions, each output port 8 is configured to include an output buffer 9. Each output port can simultaneously be outputting packets as well as receiving new packets for output at a later time. Typically the output buffer 9 is sized to be sufficiently large, such that no data packets are dropped.

Conventional routers, including the routers of FIGS. 1a and 1b, include buffers that are sized to support a particular bandwidth (B). If the input bandwidth is too high, the router will drop data. The amount of input bandwidth is dependent on a number of factors including: the line input rate, the speed of the look-up process, and the blocking characteristics for the switching device. Input bandwidth also relates to the processing power of the packet processor, where the processing power is related to: (1) the delay bandwidth memory, (i.e., more memory is required for bigger and faster systems); and (2) the packet lookup power, (i.e., the ability to determine where to route packets).

A key problem in designing routers is to make them scale to large aggregate bandwidth. Building larger monolithic systems is made difficult by hard technology limits on the integrated circuits in these systems. In addition, long development times for the redesign of a whole system prohibit internet service providers from keeping up with the growth of bandwidth demand. To process a larger amount of bandwidth in a single system (i.e., a bandwidth of an amount N*B where N is a positive integer), the size and to configuration of a conventional router typically has to be modified or redesigned. The process of modifying a router to increase bandwidth capability entails tedious design processes involving risk that the new design will not perform as intended—(or at all), outlay of resources—(both monetary and human), as well as time delays.

SUMMARY

In one aspect the invention provides a bandwidth divider for allocating bandwidth between a plurality of packet processors. The bandwidth divider comprises a plurality of counters for measuring the bandwidth of data packets transferred from the bandwidth divider to a respective packet processor; and a controller for analyzing the plurality of counters and transferring a data packet to a selected packet processor based on the contents of the counters.

The bandwidth divider may also include a plurality of interfaces, each coupled to an input and output stream where there is a counter and/or queues for each input stream/packet processor combination. The packet processor may be a packet forwarding engine. The counter may indicate the level of bandwidth consumption of a packet processor, and such indication of bandwidth consumption may be decremented over time in accordance with a decrement engine employing a half-life decay or other function. The indication of level of bandwidth consumption may also be normalized after each packet is processed using a normalizing engine, and may be normalized such that the lowest indication for all counters is 0. In a system measuring bandwidth consumption, the controller may transfer a data packet to the packet processor with the lowest bandwidth consumption or, if the controller determines that a plurality of packet processors have an identical, lowest bandwidth consumption, the controller may use a random selector, transferring the data packet randomly (using for example a Linear Feedback Shift Register function) to one of the plurality packet processors having the lowest bandwidth consumption. In another aspect, the invention provides a router, which in turn comprises: a plurality of bandwidth dividers for receiving a first set of input streams and providing a first set of output streams; a plurality of packet processors for receiving the first set of output streams from the bandwidth dividers and providing a second set of input streams; a plurality of counters for monitoring the flow of data from the bandwidth dividers to the packet processors; a controller for monitoring the counters and allocating the streams of data between the packet processors; and a plurality of cross-bars for receiving the second set of input streams from the packet processors, multiplexing the second set of input streams, and providing a second set of output streams.

In another aspect, the invention provides a method of directing data packets to a plurality of packet processors. The method comprises the steps of: monitoring the bandwidth consumed by the packet processors; determining, based on the bandwidth consumed by the packet processors, which packet processor has consumed the least amount of bandwidth; and allocating a next data packet to the packet processor which has consumed the least amount of bandwidth.

Aspects of the invention include one or more of the following features. The method of directing data packets may include the step of incrementing counters to track the bandwidth consumed by the packet processors, wherein such step may include incrementing one counter for each input and output pair to track the bandwidth consumed by the packet processors. The determining step may include (1) comparing the counters to ascertain the counter with the lowest value and/or (2) determining if two or more counters have the identical, lowest value; and if two or more counters have the identical, lowest value, allocating the data packet randomly as between the packets with the identical, lowest value. The method may include decrementing the counters over time, using for example a half-life decay function. The method may also include the step of normalizing the counters, for example by subtracting the value of the lowest counter from all counter values.

Aspects of the invention may include one or more of the following advantages. A system is provided for processing B*N amount of bandwidth in a single router without altering the size of the packet processors, where a packet processor is a receiver and processor of data packets. Each packet processor can be of the form of a packet forwarding engine ("PFE"). A PFE is a routing core with delay bandwidth memory and a route lookup function.

A distributed system is provided where each bandwidth divider runs the same algorithm. As such, the bandwidth consumed by the packet processors is balanced. Because the system is distributed and is not controlled by a centralized controller, the system is more scalable and is more fault tolerant (i.e., a failure of any given bandwidth divider will only affect the input streams directly connected to that bandwidth divider).

The invention allows multiple packet processors to be seamlessly integrated into a system such that they perform the function of a single router. The invention supports the interconnection of multiple packet processors, increasing system bandwidth without expending resources to develop a new router or incurring the risks associated with designing and developing a higher capacity router. The invention allows a designer to build a system that supports N times the bandwidth of a single packet processor by using numerous currently existing packet processors combined with a single bandwidth divider.

The invention further allows for all the benefits of a common pool of memory to be achieved while maintaining a queue organization that does not exhibit head-of-line (HOL) blocking problems, i.e., the condition defined by the inability to send a packet which is ready for transmission because the device is waiting for another packet to become ready for transmission.

The details of one or more implementations of the invention are set forth in the accompanying drawings and the description below. Other features, objects, and advantages of the invention will be apparent from the description and drawings, and from the claims.

DESCRIPTION OF DRAWINGS

FIG. 4 is a flow chart indicating the steps performed by a bandwidth divider of FIG. 2a.

FIG. 5 is a flow chart indicating the steps performed by an IO counter of FIG. 2a.

FIGS. 6a and 6b are flow charts indicating the functions performed by a controller of FIG. 2a.

Like reference symbols in the various drawings indicate like elements.

DETAILED DESCRIPTION

Figure 2A:
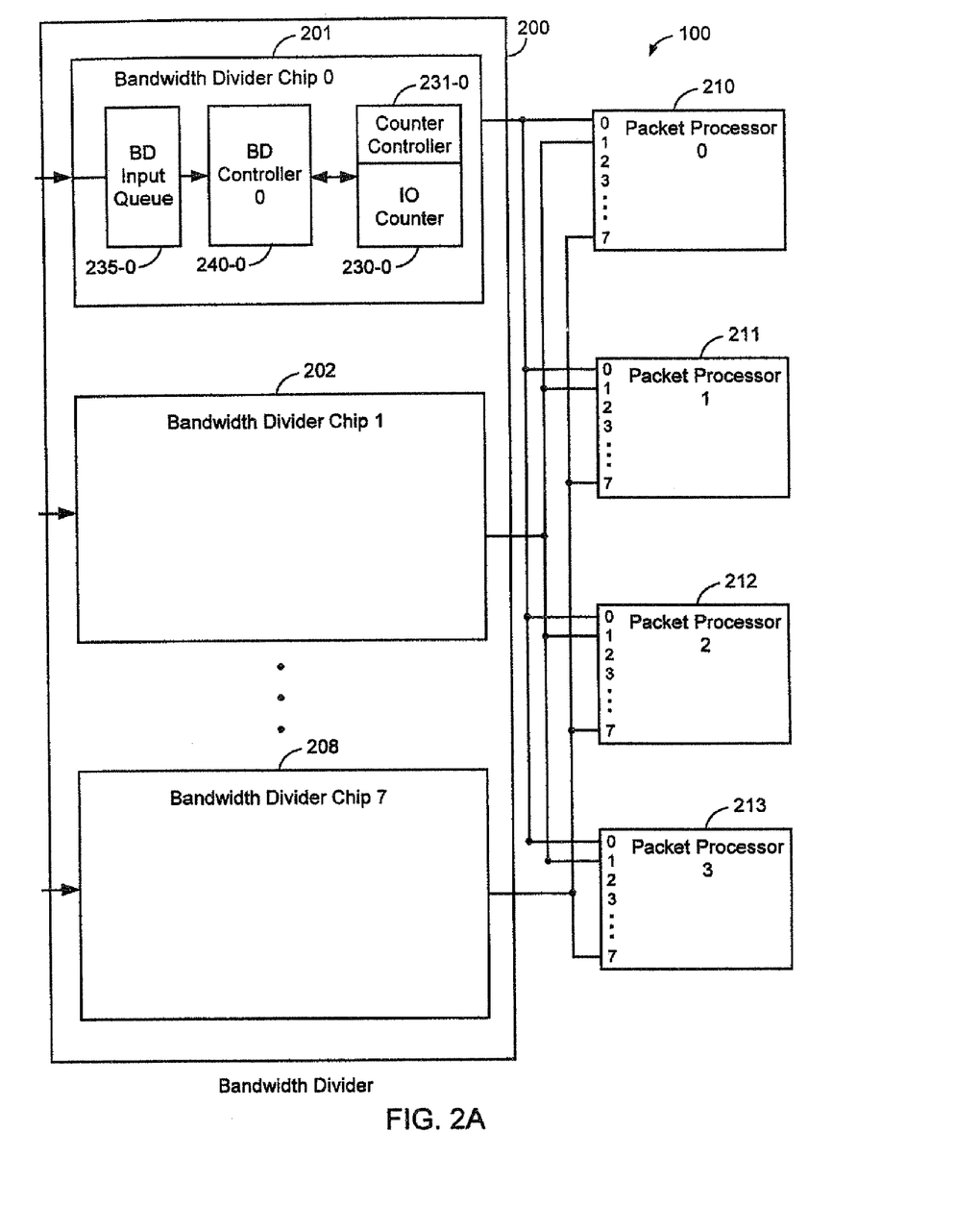
FIG. 2a is a schematic block diagram of an implementation of a data routing system.

Referring to FIG. 2a, data routing system 100 includes a bandwidth divider (BD) 200 for spraying packets amongst a plurality of packet processors, 210-213. In one implementation, BD 200 includes a plurality of bandwidth divider integrated circuits (bandwidth divider chips BD0-BD7), 201-208, each of which include a controller 240-0 to 240-7 and an IO counter 230-0 to 230-7. Bandwidth divider chip BD0, 201, is connected to input port 0 of each of packet processors (210-213). Similarly, bandwidth divider chip BD1 202 is connected to input port 1 of each of packet processors 0-4 (210-213). Bandwidth divider chips BD2-BD7 (203-208) are similarly connected. The input to each bandwidth divider chip (BD0-BD7), 201-208, is received by and stored in BD input queues 235-0 to 235-7. In one implementation, the BD input queues 235-0 to 235-7 buffer the data packets until they have been completely received and until a decision is made as to where to route the packets. In this implementation, the BD chips 201-208 act as store-and-forward devices, i.e. the BD chips 201-208 will store a whole packet before routing that packet to a packet processor. Packet length is determined when the end of a packet is received. As such, the decision about where a packet is to be sent is made after the whole packet has been received. One advantage of the BD 200 being a store-and-forward device is that by postponing a forwarding decision until the packet length is known, the load is optimally balanced amongst the packet processors. In one implementation, the memory in a BD chip 201-208 is sized to hold a maximum sized packet in all of its BD input queues, 235-0 to 235-7.

In one implementation separate queues are maintained for each input stream/packet processor pair, e.g. if the number of input streams is 16 and the number of packet processors to which the BD chip 201-208 is connected is 4, the total number of queues will be 64. This configuration eliminates HOL blocking.

When a packet has been received in its entirety, the packet is assigned to a queue in the BD 200 based on its input stream and packet processor destination, e.g. all packets from stream 3, which are routed to packet processor 0, 210, are routed to the same queue. Thus, in one implementation, the minimum total memory size will be: (Number of queues)*MTU, where MTU is the maximum transfer unit defined as the maximum packet size plus some smaller amount of extra storage proportional to the delay associated with starting to send a packet after the packet has been received in its entirety.

Since input streams can be of varying speeds, in one implementation it would be efficient to have a common pool of memory for all data, rather than dedicated memory for each queue. A common pool of memory means that any data cell in memory can be used by any input stream. Since the total bandwidth of all input streams combined is fixed, this allows the BD 200 to allocate memory in the common memory pool based on the actual speed of the stream rather than the worst case maximum (which would be one stream using all of the input bandwidth).

Thus, the common memory pool can be organized as fixed sized data quantities (32 bytes per cell) and queues can be organized as linked lists of data. In a linked list each data cell includes the address or pointer to the next data cell of the queue associated with the packet such that, when the packet is read out of memory, the reader knows the location of the next data cell.

One problem with making a forwarding decision after the entire packet has been received is that the BD 200 does not know to which queue a packet is assigned until after the packet has been received. In one implementation, the BD 200 solves this problem without using extra memory. In one implementation, the global memory is organized into cells, each of which can hold 32-bytes of data and each of which stores a pointer to the next cell. A packet (which is typically greater than 32 bytes) may occupy multiple cells that are linked as described above. Each queue consists of a linked list of packets that are linked together. The linked lists of the packets in the queue create a consecutive linked list. At the time that a packet is received, the packet is written into memory, the cells of the packet are linked together (not yet assigned to a queue), and the address of the first cell of the packet is saved. When the packet has been entirely received, the BD makes a decision as to which queue (i.e., as to which packet processor) the packet should be assigned. The BD then takes the saved address of the first cell of the packet and writes the saved address into the link information field of the last cell of the last packet of the appropriate queue. The packet is then linked to the queue and the packet reader follows the linked list of the queue. Referring again to FIG. 2*a*, controllers 240-0 to 240-7 read data from the BD input queues 235-0 to 235-7. Within each bandwidth divider chip 201-208, each controller, 240-0 to 240-7, is connected to an IO counter, 230-0 to 230-7. The IO counter 230-0 to 230-7 includes an array of counters and a counter controller 231-0 to 231-7. In one implementation, the number of counters can be equal to the number of input streams to the BD chips 201-208 multiplied by the number of packet processors. In the configuration shown where BD0 includes 8 input streams and four packet processors, IO counter 230 includes an array of 32 counters. The counter controllers 231-0 to 231-7 monitor each stream of data. Each counter's count reflects the flow of data between the respective BD chip data stream and a packet processor. For example, the first counter in IO counter 230-0 tracks the flow of data from the first stream into BD0, 201, to packet processor 0, 210, and the last counter in IO counter 230-7 tracks the flow of data from the last stream in BD7, 208, to packet processor 3, 213.

In one implementation, the size of each counter is slightly larger than the largest packet potentially sent to any BD chip 201-208. For example, the size of each counter could be chosen to be $\log_2(MTU*4)$ bits, where MTU is the maximum transfer unit defined above. This counter size provides a comfortable margin for the transfer of packets through the system.

IO counters 230-1 to 230-7 and controllers 240-1 to 240-7 are interconnected allowing controllers 240-0 to 240-7 to read and manipulate the counters.

Figure 2B:
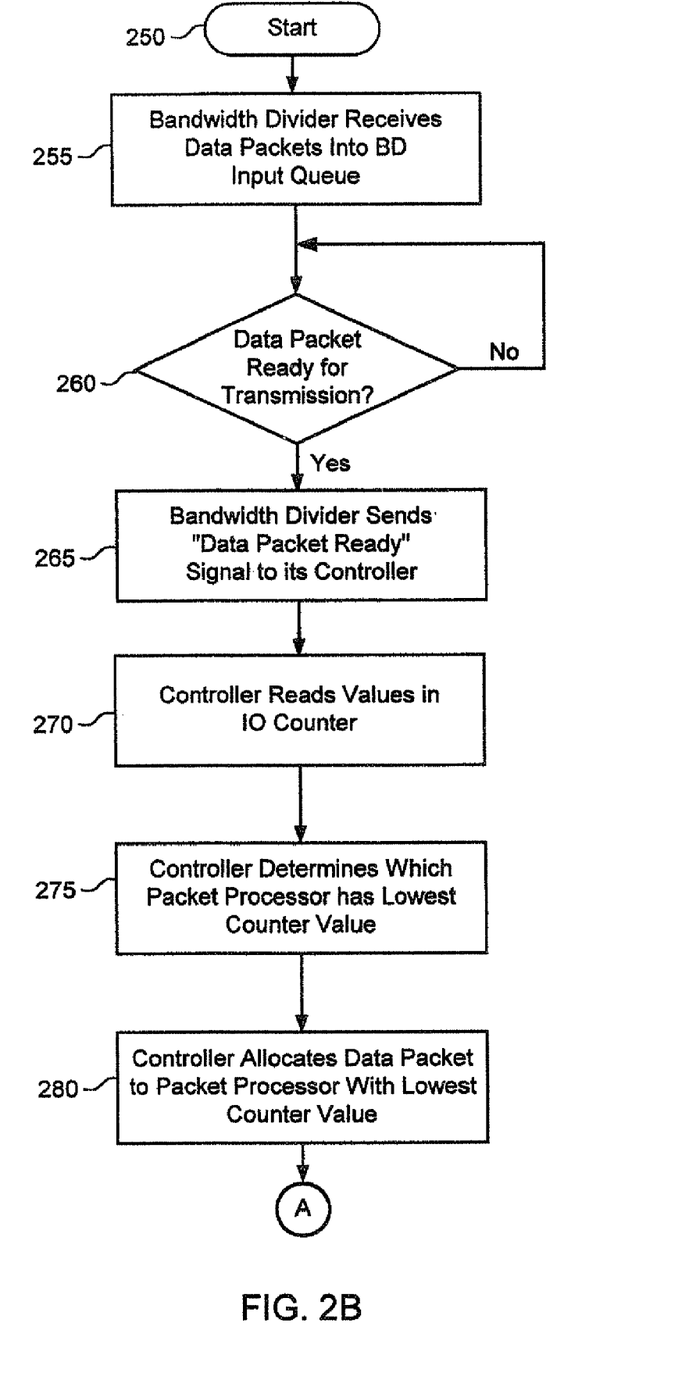
FIG. 2b is a flow chart illustrating the flow of data through the data routing system.

FIG. 2*b* illustrates the flow of data. Bandwidth divider 200 receives data packets into the BD input queues 235-0 to 235-7 (255). When each packet is ready for transmission (260), the bandwidth divider chip 201-208 receiving the data packet sends a data packet ready-signal to its respective controller 240-0 to 240-7 (265). The controller 240-0 to 240-7 reads the values of the counters in the respective 10 counter 230-0 to 230-7, (270) and determines which packet processor has the lowest counter value (indicating that the packet processor associated with that counter has consumed the least amount of bandwidth) (275). The controller 240-0 to 240-7 then allocates the data packet to the packet processor with the lowest counter value (280).

After the data packet is allocated, two events occur (in no particular order). First, the data packet length is read by the IO counter's counter controller 231-0 to 231-7 (285). The appropriate counter is incremented by the length of the data packet (measured in bytes) (290). Second, the data packet is transferred to the packet processor to which the data packet was allocated (295).

In one implementation, the counters are then decremented using a decrement engine employing a decay function. This decrementation is performed to ensure that the counters approximately reflect the amount of bandwidth currently being processed by the packet processors.

For example, consider a large sized packet (X bytes) sent to a first packet processor by BD0, 201, a long time ago, such that the packet has already been forwarded out of the packet processor. If IO counter 230-0 was not adjusted to reflect the bandwidth currently being processed by the packet processors, packet processor 0 would appear more loaded than the other packet processors. Now, suppose a burst of minimum sized packets is received by the bandwidth divider. If the packet processor 0 counter was not adjusted, the BD 200 would not send any of the new packets to the first packet processor until the number of bytes received by the other packet processors reached the number of bytes originally received and processed by the first packet processor (i.e., X bytes). This would mean that only N−1 packet processors would be available to absorb the burst of small packets. The load on the packet processors would not actually be balanced, resulting in performance degradation of the system.

Figure 2C:
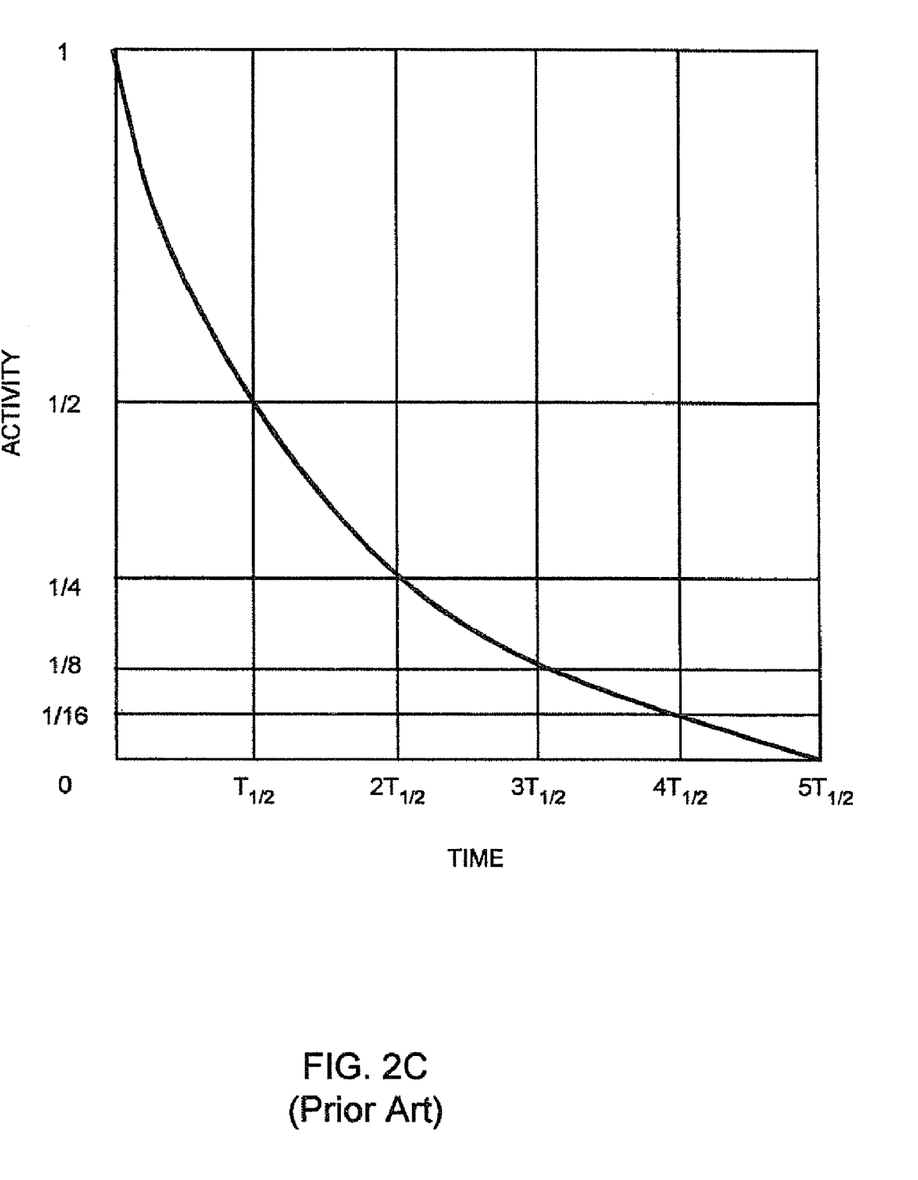
FIG. 2c illustrates a graphical representation of a half-life function.

When the first packet processor is out of parity with the others, undesirable packet reordering can occur once the packet processors achieve parity. Those packet processors most recently used, 211-213 in this example, will behave sluggishly compared to the first packet processor 210. Although any type of decay function can be used, one decay function is a half-life function shown in FIG. 2*c*. The half-life function is defined mathematically by:

$$T_{1/2} = \frac{\ln 2}{\lambda}$$

where $T_{1/2}$ is the half life, ln is the natural logarithm, and $\lambda$ is the decay constant. The half-life function approximates a decay in which, over each period of time $T_{1/2}$, the number of bytes in a counter decreases by half. In a second time interval $T_{1/2}$, the bandwidth again decreases by half, such that the number of bytes remaining after successive intervals is ½, ¼, ⅛, and so forth. The decay constant, $\lambda$, which dictates the rate of decay, can be chosen based on the properties of the packet processors. The decay constant can be implemented in the IO counters 230-0 to 230-7 using a programmable register.

The value of the half-life interval, $T_{1/2}$, can be proportional to the delay through a PFE. A decay constant should be selected that is not so small that information regarding the state of the packet processors or PFE is lost too quickly. Similarly, the decay constant should not be so large as to eviscerate the role of the decay function.

In another implementation, the counters are normalized using a normalization engine by subtracting the lowest counter value from all counter values such that the lowest counter value is zero. Normalizing prevents wrap around errors, i.e., errors that occur when a counter reaches its maximum value and "wraps around" to 0. Comparisons between counters can still be made even if the counters are allowed to wrap-around. A comparison routine would, however, need to compensate for the wrap arounds.

The implementation of FIG. 2a operates to balance the load between the various packet processors. For example, in a system with two packet processors, if the first packet processor receives a large packet, the next few smaller packets are forwarded to the second packet processor.

Figure 3:
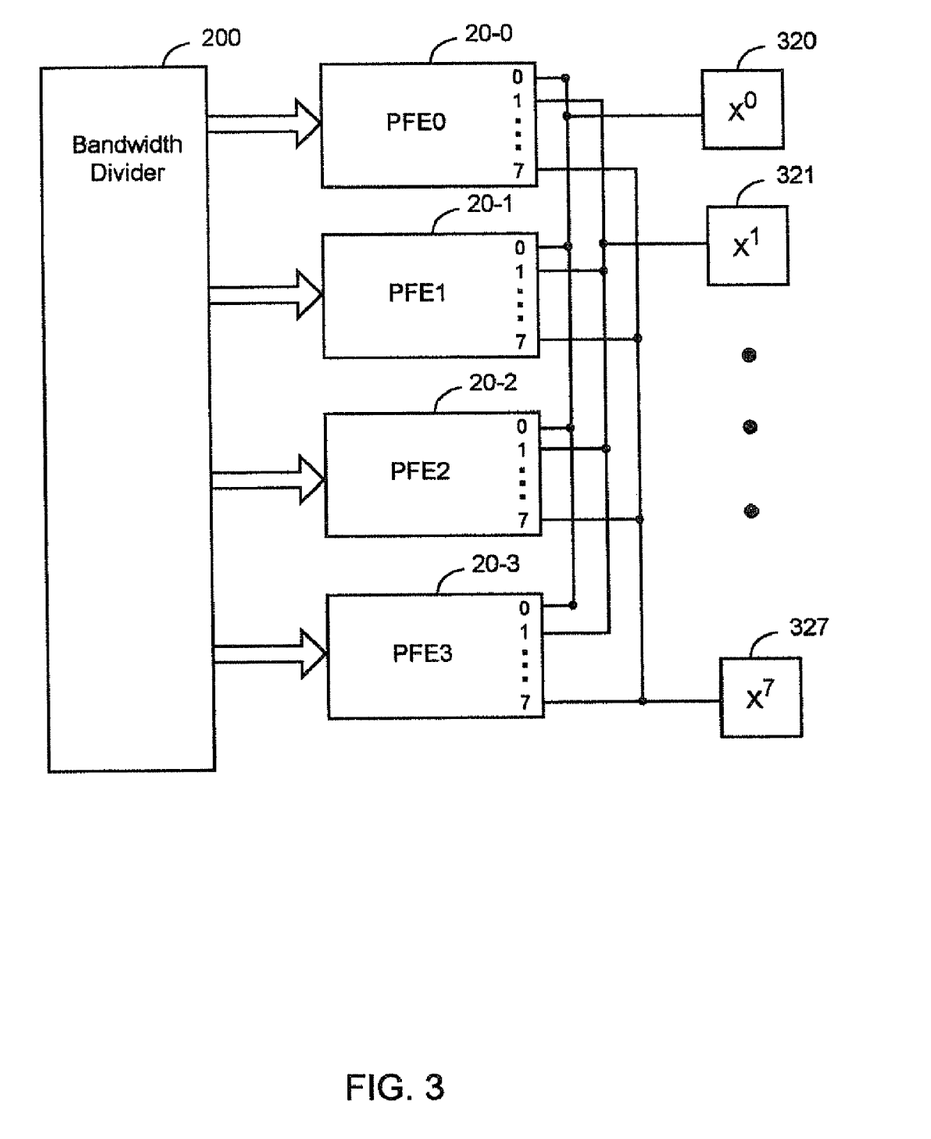
FIG. 3 is a schematic block diagram of a bandwidth divider according to one implementation of the present invention, connected to four high speed switching devices and eight output crossbars.

FIG. 3 illustrates the bandwidth divider 200 of FIG. 2a connected to four PFEs, 20-0 to 20-3, which in turn are connected to output crossbars $X^0$-$X^7$, 320-327. The bandwidth divider 200 operates in the same manner as described with respect to FIG. 2a.

The output ports 0-7 of each of the PFEs, 20-0 to 20-3, are connected to the respective output crossbars $X^0$-$X^7$, 320-327 (such that each PFE output port 0 is connected to output crossbar $X^0$ 320, each output port 1 is connected to $X^1$ 321, and so forth). The output crossbars send data out in the order in which the crossbars receive the data (typically using a First In, First Out ("FIFO") system).

Figure 4:
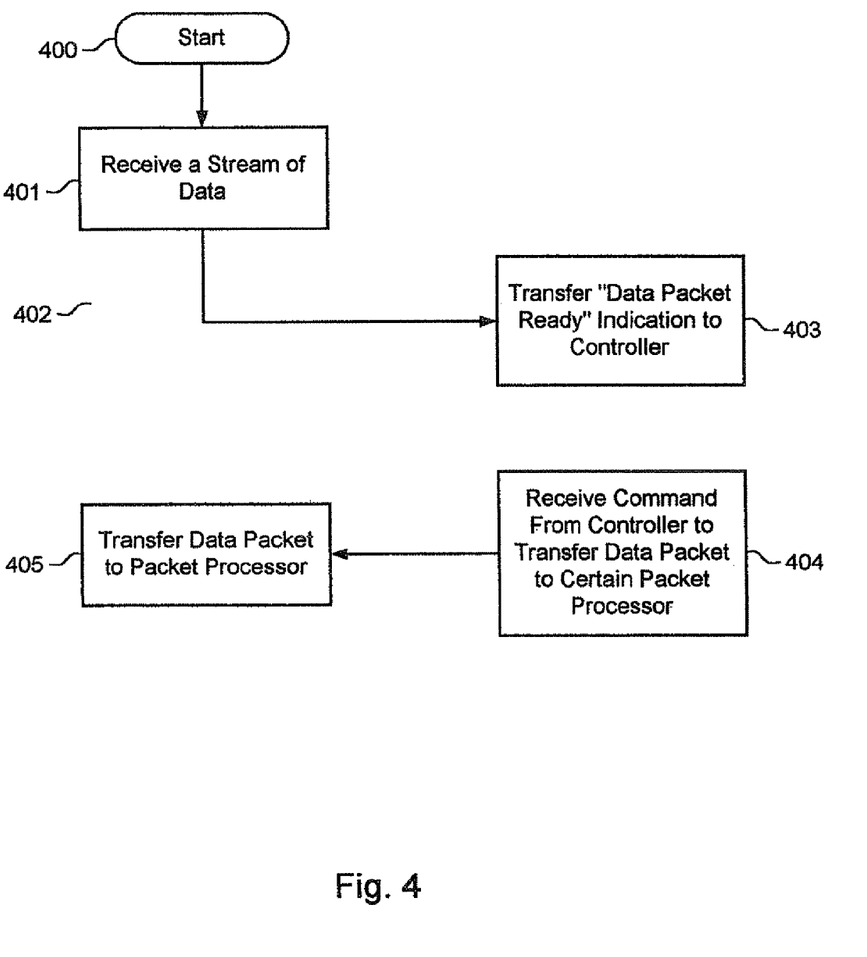

FIG. 4 is a flow chart illustrating the steps performed by the bandwidth divider chips, 201-208. A BD chip 201-208 receives a data packet as an input (401). The BD chip 201-208 then sends a "data packet ready" signal to their respective controller 240-0 to 240-7 (403). At this stage, the BD chip is in a state of stasis until it receives a signal back from the controller 240-0 to 240-7. After a certain period of time, i.e. after the controllers 240-0 to 240-7 allocate the data packet, the BD chip receives a command from the controller to transfer the data packet to a certain one of the packet processors 210-213 (404). The BD chip then transfers the data packet as instructed (405).

Figure 5:
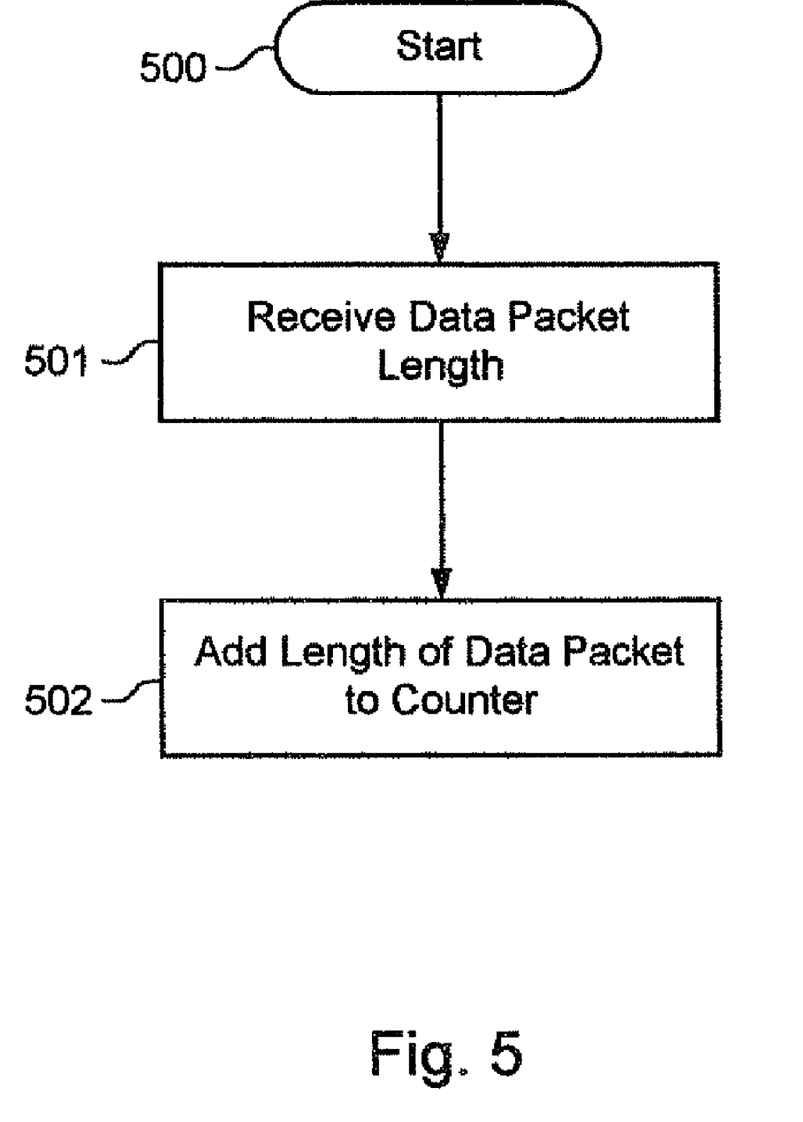

FIG. 5 is a flow chart illustrating the operation of the IO counters 230-0 to 230-7. Once controller 240-0 to 240-7 allocates the data packet to a certain one of the packet processors 210-213, the size of the data packet is determined and stored in the appropriate one of the counters in IO counter 230-0 to 230-7. The appropriate one of the counters in IO counter 230 receives the data packet length of the data packet being forwarded from a certain input to a certain output (packet processor) (501) and adds the length of the data packet to the value of the counter (502).

Figure 6A:
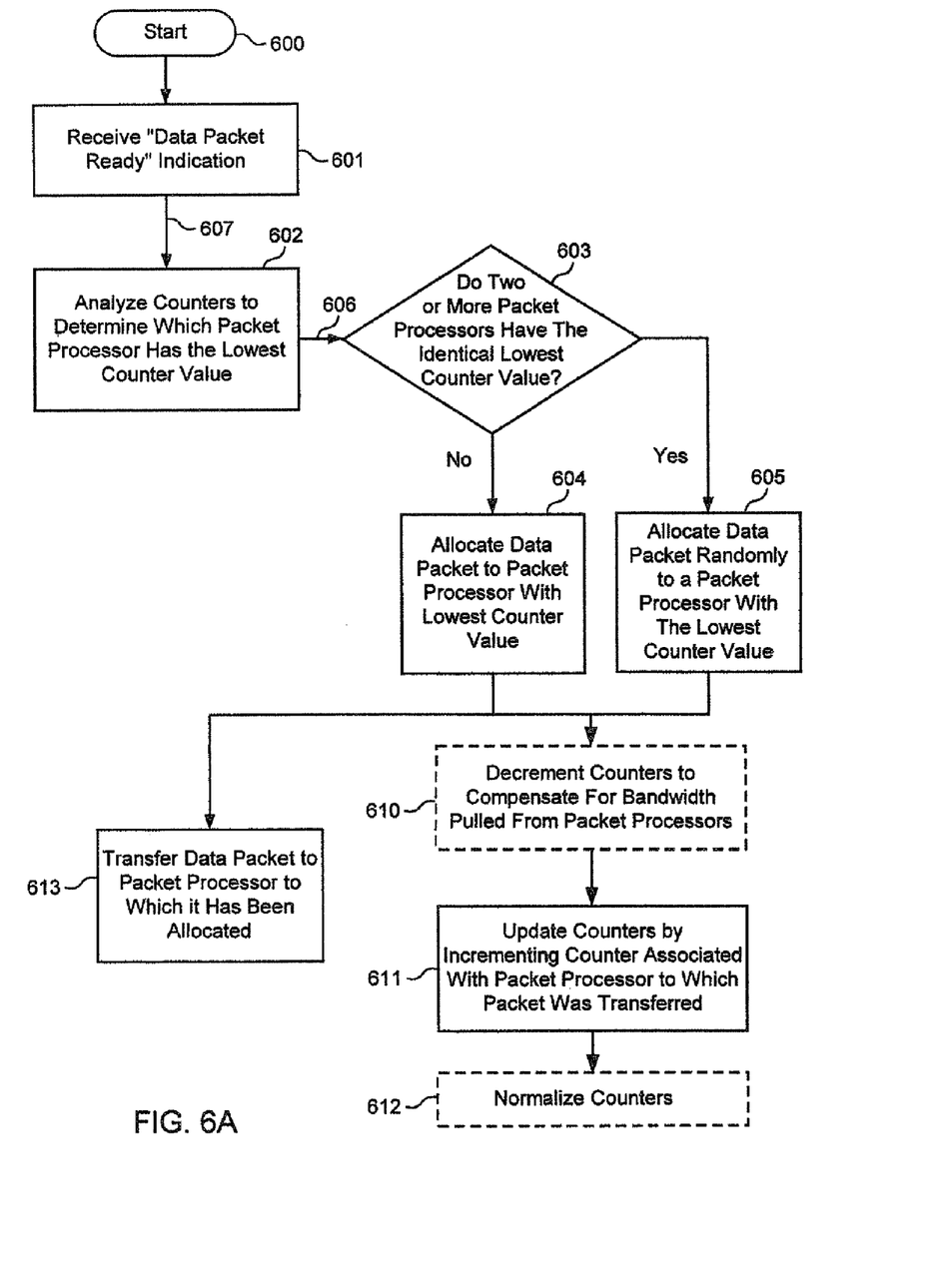
Figure 6B:
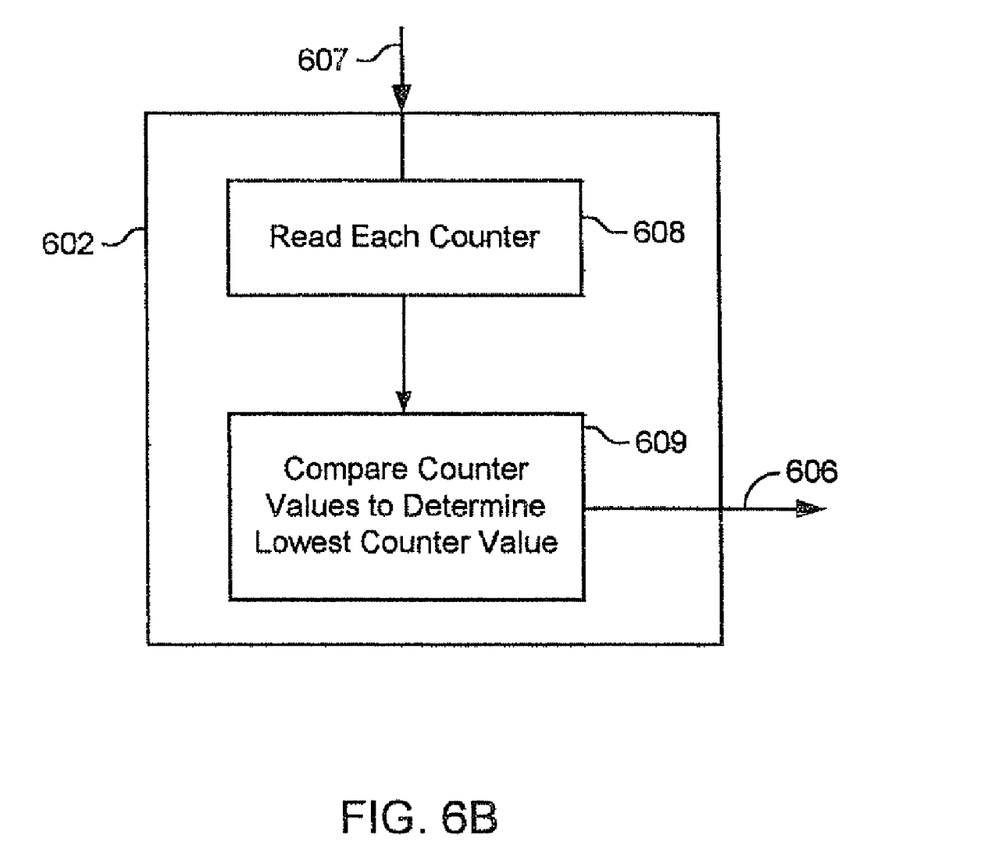

FIGS. 6a and 6b are flow diagrams indicating the functions performed by the controllers 240-0 to 240-7. The controller process begins upon receipt of a "data packet ready" indication (601). The controller 240-0 to 240-7 then analyzes the appropriate 10 counter 230-0 to 230-7 to determine which packet processor has the lowest counter reading (602). This analysis includes the steps of reading each counter within the appropriate 10 counter 230-0 to 230-7 (FIG. 6b, 608); and comparing each counter value to determine which counters (and hence packet processors) has/have the lowest counter value/bandwidth rating (FIG. 6b, 609). Once the analysis is complete, the controller 240-0 to 240-7 determines if two or more packet processors (or counters) have identical counter values (603). If they do not, and there is a counter with a single lowest value, then the controller allocates the data packet to that packet processor (604). Allocation includes sending a response back to the BD chip indicating the processor to which the packet has been allocated.

If two or more counters have the identical lowest value (which will be zero if the counters have been normalized), and a decay function is being utilized, then either it has been a long time since data packets were sent to the packet processors, or two or more packet processors have the same load. In either event, it is important to ensure an even distribution of packets among the packet processors. Sending every packet when a tie arises to the same packet processor would effect the output queue distribution of the packet processor. Thus, regardless of whether a decay function is used, to keep a random distribution of packets, the controller allocates the data packet to one of the packet processors with the low/zero value in a random fashion (605) using a random selector. In one implementation, a Linear Feedback Shift Register ("LFSR") random routine is used to allocate the packet randomly.

Once the data packet has been allocated to the appropriate one of the packet processors 210-213, in some implementations, the counters are updated (610). The process of updating can include decrementing the counter using a decrement engine, so as to track the current bandwidth of each packet processor. In one implementation each counter is decremented in accordance with its allocated bandwidth. One such updating process utilizes a half-life decay function to approximate the portion of the bandwidth currently used by each packet processor.

After the data packet has been allocated to the appropriate one of the packet processors 210-213, the controller 240-0 to 240-7 updates the IO counter 230-0 to 230-7 to reflect the bandwidth consumed by the data processor that received the data packet (611).

In some implementations, the counters are then normalized (612). In one such implementation, the counter with the lowest value is reset to zero. All other counters are adjusted downward by the same amount that the lowest counter was adjusted downward (so that the differences between the counter readings remains unchanged).

The implementations as described allow several options for scaling the system. Assuming that the processing power of a packet processor is a fixed number, then the system can be scaled by either increasing the number of packet processors 210-213 without changing the architecture of the bandwidth divider 200 or number of bandwidth divider chips 201-208, or by increasing the number of packet processors and modifying the architecture of the bandwidth divider 200 (by increasing the number of bandwidth divider chips 201-208) such that each bandwidth divider chip 201-208 receives a single stream of data. Scaling using the former option can be realized by increasing the memory and number of pins in each BD chip 201-208. Scaling using the latter option can be realized by increasing the number of bandwidth divider chips 201-208 by the number of streams that were previously received by each bandwidth divider chip 201-208. Using this scaling technique, the bandwidth capacity of the system can be increased by a factor equal to the number of streams previously received by the bandwidth divider chips 201-208, while maintaining the same memory and pin count for each bandwidth divider chip 201-208. Either means of scalability allows for infinite scalability, limited only by potential memory and pin count restrictions.

A number of implementations of the invention have been described. Nevertheless, it will be understood that various modifications may be made without departing from the spirit and scope of the invention. For example, although the system has been illustrated as including a number of separate components—bandwidth dividers, controller and counters—the system can be implemented with varying hardware without departing from the scope of the invention. Although the flow diagrams depicted in FIGS. 4, 5, 6a and 6b assume the use of three separate components, more or less components may be used to perform the same functions. Furthermore, although the counters may be described as incrementing or decrementing to perform a particular function, any function can be implemented by either a decrementing or incrementing routine. Lastly, the order of the steps illustrated in FIGS. 4, 5, 6a and 6b, as well as the order illustrated in this specification, is not critical to the invention. The steps may be performed in any logical order without departing from the scope of the invention. Accordingly, other implementations are within the scope of the following claims.

What is claimed is:

1. A system comprising:
   a plurality of packet processors;
   a bandwidth divider that includes a plurality of queues corresponding to the plurality of packet processors, where each queue is to receive and forward packets from and to a corresponding one of the plurality of packet processors; and
   a plurality of counters to monitor a flow of data between the bandwidth divider and the plurality of packet processors.

2. The system of claim 1, where the bandwidth divider further includes:
   a plurality of interfaces, each interface being coupled to an input and output stream.

3. The system of claim 2, where the bandwidth divider is to:
   allocate memory in a common memory pool based on a speed of at least one of the input streams.

4. The system of claim 3, where the common memory pool is further to:
   store packets for the plurality of queues as linked lists of packets.

5. The system of claim 4, where the common memory pool is further to:
   store data associated with a received packet as a linked list of data and
   add the linked list of data associated with the received packet to one of the linked lists of packets after the received packet is entirely received.

6. The system of claim 5, where, when the linked list of data associated with the received packet is added to the one of the linked lists of packets, the common memory pool is to:
   write an address of a first portion of the linked list of data associated with the received packet into a link information field of a last packet of an assigned queue.

7. The system of claim 1, further comprising:
   a plurality of output crossbars corresponding to the plurality of packet processors.

8. The system of claim 7, where each of the plurality of packet processors includes a plurality of output ports, where each output port is connected to a different one of the plurality of output crossbars.

9. The system of claim 8, where the plurality of output crossbars are to send data out in an order in which the plurality of output crossbars receive data from the plurality of packet processors.

10. A method comprising:
    receiving, at a bandwidth divider, data associated with a packet;
    storing, in a common memory pool, the data associated with the packet;
    assigning, by the bandwidth divider, the data associated with the packet to one of a plurality of queues;
    transmitting, by the bandwidth divider, the data associated with the packet to one of a plurality of packet processors, where each of the plurality of queues corresponds to one of the plurality of packet processors; and
    monitoring, by a plurality of counters, a flow of data between the bandwidth divider and the plurality of packet processors.

11. The method of claim 10, where the bandwidth divider includes a plurality of interfaces and receiving the data associated with the packet further includes receiving the data associated the packet through one of the plurality of interfaces.

12. The method of claim 11, further comprising:
    allocating, with the bandwidth divider, memory in the common memory pool based on a speed of at least one of a plurality of input streams.

13. The method of claim 10, further comprising:
    storing, in the common memory pool, packets for the plurality of queues as linked lists of data.

14. The method of claim 13, further comprising:
    adding, in the common memory pool, a linked list of data associated with the packet to the linked lists of data after the packet is entirely received.

15. The method of claim 14, where adding the linked list of data associated with the packet to the linked lists of data further comprises:
    writing an address associated with a first portion of the linked list of data associated with the packet into a link information field of an assigned queue.

16. The method of claim 10, further comprising:
    associating a plurality of output crossbars with the plurality of packet processors, where an output port of each of the plurality of packet processors is connected to a different one of the plurality of output crossbars.

17. The method of claim 16, further comprising:
    transmitting, from the one of the plurality of packet processors, the data associated with the packet to one of the plurality of output crossbars.

18. The method of claim 17, further comprising:
    transmitting, by the one of the plurality of output crossbars, data in an order in which the plurality of output crossbars receives data from the plurality of packet processors.

19. A method comprising:
    receiving, by a bandwidth divider, a first set of input streams;
    transmitting, by the bandwidth divider, a first set of output streams based on the first set of input streams;
    receiving, by a plurality of packet processors, the first set of output streams;
    transmitting, by the plurality of packet processors, a second set of input streams to a plurality of crossbars based on the first set of output streams;
    receiving, by a plurality of crossbars, the second set of input streams;
    multiplexing, by the plurality of crossbars, the second set of input streams; and
    transmitting, by the plurality of crossbars, a second set of output streams based on the multiplexed second set of input streams.

* * * * *